(12) United States Patent
Fushiki et al.

(10) Patent No.: US 7,065,249 B2
(45) Date of Patent: Jun. 20, 2006

(54) SYSTEM AND METHOD FOR IMAGE EDITING

(75) Inventors: Ikko Fushiki, Sunnyvale, CA (US); Ke-Cheng Huang, Cupertino, CA (US)

(73) Assignee: Microsoft Corp., Redmond, WA (US)

( * ) Notice: Subject to any disclaimer, the term of this patent is extended or adjusted under 35 U.S.C. 154(b) by 738 days.

(21) Appl. No.: 10/202,775

(22) Filed: Jul. 25, 2002

(65) Prior Publication Data

US 2004/0044732 A1    Mar. 4, 2004

(51) Int. Cl.
*G06K 9/00* (2006.01)
(52) U.S. Cl. ...................................... 382/167
(58) Field of Classification Search ........... 382/162, 382/167, 295, 296, 298, 309
See application file for complete search history.

(56) References Cited

U.S. PATENT DOCUMENTS

| | | | |
|---|---|---|---|
| 6,061,683 A | 5/2000 | Alonso | |
| 6,577,311 B1 * | 6/2003 | Crosby et al. | 345/428 |
| 6,707,931 B1 * | 3/2004 | Herbert | 382/112 |
| 2002/0112180 A1 * | 8/2002 | Land et al. | 713/200 |

OTHER PUBLICATIONS

Luis Alonso: "Un sistema generico de replication de dator para computacion movil", May 1999.

WIPO published international application WO 02/33575 A, published Apr. 25, 2004.
Preguica, "Data Management Support for Asynchronous Groupware", Proceedings, ACM Conference on Computer Supported Cooperative Work 2000, 2000, pp. 69-78.
WO0106364, *Method and Apparatus for Prioritizing Data Change Requests and Maintaining Data Consistency in a Distributed Computer System Equipped for Activity-Based Collaboration*, Groove Networks, published Jan. 25, 2001.

* cited by examiner

*Primary Examiner*—Phuoc Tran
(74) *Attorney, Agent, or Firm*—Lyon & Harr, LLP; Katrina A. Lyon

(57) ABSTRACT

A system and method for editing images. Each image editing operation is described by a few parameters. Multiple users can share image processing changes by sharing a few set of parameters instead of the whole bitmaps of the images. An Editing List describes the parameters defining the image changes. The size of Editing List is very small and is ideal for network transmission and collaboration. Image Editing Lists are independent of the images themselves. By decoupling the Image Editing Lists from the original bitmap images, other advantages are obtained. For instance, the same Editing List can be applied to other images and also to multiple images at the same time. Rendering of the modified images can be performed at a later time and only when necessary. In case of collaborative editing, the transmission time is reduced drastically.

17 Claims, 7 Drawing Sheets

SYSTEM AND METHOD FOR IMAGE EDITING

BACKGROUND

1. Technical Field

This invention is directed toward a system and process for digital image processing. More particularly, the invention is directed toward an efficient method for editing images over a network.

2. Background Art

Digital cameras are becoming popular and their sales have increased rapidly in recent years. Since digital cameras have become so popular, there has been an increased desire to share the photos taken with these cameras between family members, friends and coworkers. Business use of these images has also increased dramatically. Digital images are frequently used in marketing materials, technical papers, reports and Internet websites. The evolution of the Internet, and its increased global use, coupled with the increased popularity of electronic mail, has made image sharing easier. However, digital image sharing over a network such as the Internet has its disadvantages.

Digital images are typically bitmap files that have very large data sizes as compared with text files. As a result, digital images consume a huge amount of hard drive space. In addition, their large file size makes digital image data files consume large amounts of computer resources and network bandwidth to process and transmit them over a network. Image data transmission rates are typically very slow as a result. Hence, it is important to reduce the amount of computer memory consumed and data transmission time to transfer such digital images by creating a way to reduce image data size.

Another aspect of digital image sharing is the quality of the images shared and used in various applications. People often seek to improve images themselves or collaboratively with others. Image-editing software, that improves the quality of digital images, has therefore also become quite popular. In a traditional darkroom, image quality is controlled with choices of films, chemicals, papers and processes. In the digital equivalent of the darkroom, images are edited with a computer system and a photo-editing program. Just as in a traditional darkroom, the quality of the digital tools has an impact on the quality of the images achieved. Digital images can be edited in a wide variety of ways using photo-editing software. In some cases an editing program is used to improve an image by eliminating or reducing its flaws. For example, some photo-editing operations that improve a digital image include: cropping, adjusting brightness and contrast, correcting color balance, adjusting color saturation, filtering, converting color images to black and white, hand coloring black and white photos, eliminating red eye, and resizing an image to different resolutions.

When images are collaboratively improved, the images are often sent back and forth over a network between people iteratively editing the images. The large size of the data causes data transmission delays and consumes large amounts of computer processing resources and hard drive space. This can make this iterative editing process quite cumbersome.

SUMMARY

The present invention is directed toward a system and process that overcomes the aforementioned limitations in systems for editing and transferring image data files over a network by a system and method that sends only changes to an image over a network, vice transferring the entire image back and forth repeatedly. In the present system and method of image editing, each conventional image processing operation is described by a few parameters. As a result, multiple users can share the image processing information by sharing a few parameters instead of exchanging and saving whole bitmaps. Significant data reduction is obtained by this system and method as large digital image files do not have to be transmitted back and forth over a network. Nor do multiple versions of extremely large image files have to be repeatedly saved to the user's computer hard drive.

The invention employs an Editing List that describes the image changes. The size of Editing List is very small and is independent of the image itself. By decoupling the image Editing List from the original bitmap image, other advantages are also obtained. For instance, the same Editing List can be applied to other images and also to multiple different images. Also, rendering of images can be performed at a later time from the image editing, and then only when necessary.

The Editing List is typically expressed either in binary format or in XML format. However, other formatting conventions can be used to format the Editing List as well.

In one embodiment of the invention, the Editing List is composed of a list of Key Image States. A Key Image State is basically a set of data fields that define a transitional image that is used to achieve the final edited image. The modifications in the Editing List are applied to create the final edited image when a user saves an edited image. Each Key Image State is described by a set of parameters that includes a Key Frame, Space Transform, Color Transform, Extra Transform, and Transition Transform field.

The key frame is a reference to the base bitmap to which the Space Transform, Color Transform, Extra Transform or Transition Transform apply. The Key Frame field of a Key Image State provides an identifier as to which image file is being edited or operated on. It is assumed that all parties involved in any collaborative editing have a local copy of this first key frame bitmap. The Space Transform field represents the spatial transformation commands that are used to edit the image. Such spatial commands include, for example, the conventional spatial image editing commands of rotation, translation, cropping, and resizing. The Color Transform field represents the color transformation commands that are used in image editing. These conventional image-editing commands include, for example, brightness, contrast, hue, saturation, and redeye correction. Both Space Transform and Color Transform fields can coexist at the same time since a spatial operation typically does not affect a color operation, and vice versa. The Extra Transform field represents a transformation that combines both spatial and color transformations in the same Key Image State, vice using separate Key Image States for a separate spatial transformation and a separate color transformation. By combining spatial and color transformations in this manner, greater computational efficiency can be obtained. The Transition Transform field is set when the added image transformation cannot be merged to the existing Space Transform, Color Transform, or Extra Transform fields. For example, the Transition Transform field is added when the next editing command cannot be merged with either of the current Space, Color or Extra Transform commands. When Transition Transform is added, it signals the Editing List to create another Key Image State and this Key Image State is added to the Editing List.

The image editing system and method of the invention also includes an Undo function that allows a user to reverse modifications they or other users have made. By reversing these modifications the image can be restored to a previous Key Image State.

The image editing system and method can be used in a standalone, peer-to-peer or server-client configuration.

In the stand-alone system and process for editing digital images, one or more images to be modified are input. To input the images, they can be loaded to a user's computer from a computer-readable medium or can be transferred over a network from another user or a dedicated server that is associated with an image database. Once the user has the image or images to be modified, the user makes proposed modifications to a given image, thereby creating an Editing List. The Editing List embodies image-editing commands for making the modifications to the image. Once the user is satisfied with the image as modified by the proposed changes, they can apply the Editing List to the image to modify the image.

The stand-alone system and process of the present invention allows a user to edit images in conventional ways such as changing color, hue, image size and correcting for redeye effects. However, this embodiment of the image editing application has the added advantage of allowing the user to fine tune corrections to one in a series of images and then applying these corrections to the other images in one action. This embodiment also allows the user to reverse any changes to images via the aforementioned Undo function.

In the peer-to-peer configuration of the invention, no dedicated central server is employed. In the case of peer-to-peer image editing, two or more users first receive the original images that will subsequently be edited. The images may be received via a network connection or may be downloaded from computer-readable media such as a CD ROM. Each of the users in the peer-to-peer configuration has an image exchange module as part of the Image Editing system and method of the present invention. The exchanges of images and Editing Lists are handled by the image exchange component of one of the users. One of the users initiates the image exchange process on their computer, and the other user(s) log on to this image exchange component. As one of the users modifies the original image, an Editing List is generated. Only the Editing List, not the actual modified image, is sent over the network to the one user's image exchange component, and then on to other users. When these other users receive the Editing List from the image exchange component, they also automatically exchange the Editing Lists they have generated with respect to modifications they have made to shared images. The received Editing List will automatically update the image on the users' computers in real time, since no time-consuming bitmap transmission is involved.

The system and method of the present invention can also be used for collaborative image editing by using one or more dedicated servers in a server-client configuration. In this embodiment, a Communication Server and one or more Image Data Servers that contain the actual images to be modified are employed. The Communication Server can be physically different from the Image Data Server or servers, or one server can be used to perform both the communications and image database functions. The Communication Server controls the flow of the information between users and Image Data Server(s).

In the server-client configuration, the users/clients log on to the Communications Server to use the system. The Communication Server sends copies of the images that are to be modified to the users if they do not have them already. Instead of sending the high-resolution images resident on the Image Data Server(s), smaller thumbnail versions or lower resolution versions of these images are sent to the users. By doing so, large image data files are not unnecessarily transmitted over the network.

The users then edit the images on their computers. When the users perform the image editing on the images that they have received from the Image Data Server(s), they generate and send back only the Editing Lists over the network. The Image Data Server(s) store the Editing Lists for each of the corresponding images. When another user retrieves a particular image from the Image Data Server(s), the Image Data Server(s) send the Editing Lists corresponding to the images. If the users have not received the smaller sized or lower resolution images, the Image Data Servers also send those images.

When the Editing Lists are changed or updated for the images, only the Editing Lists are sent over the network to the Image Data Servers since they already have the original images. This significantly reduces the network traffic. The Image Data Server will only send full resolution images when the users request them. Any changes in the Editing Lists are recorded and sent to the other users.

Image processing via the Editing List of the full resolution images can be processed either on server side or on user/client side. That is, the corrections to the images can be applied to the high resolution images via the Editing List before they are sent from the server, or alternately the clients can apply the Editing List to the high resolution images to obtain the modified version thereof locally on their computers.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
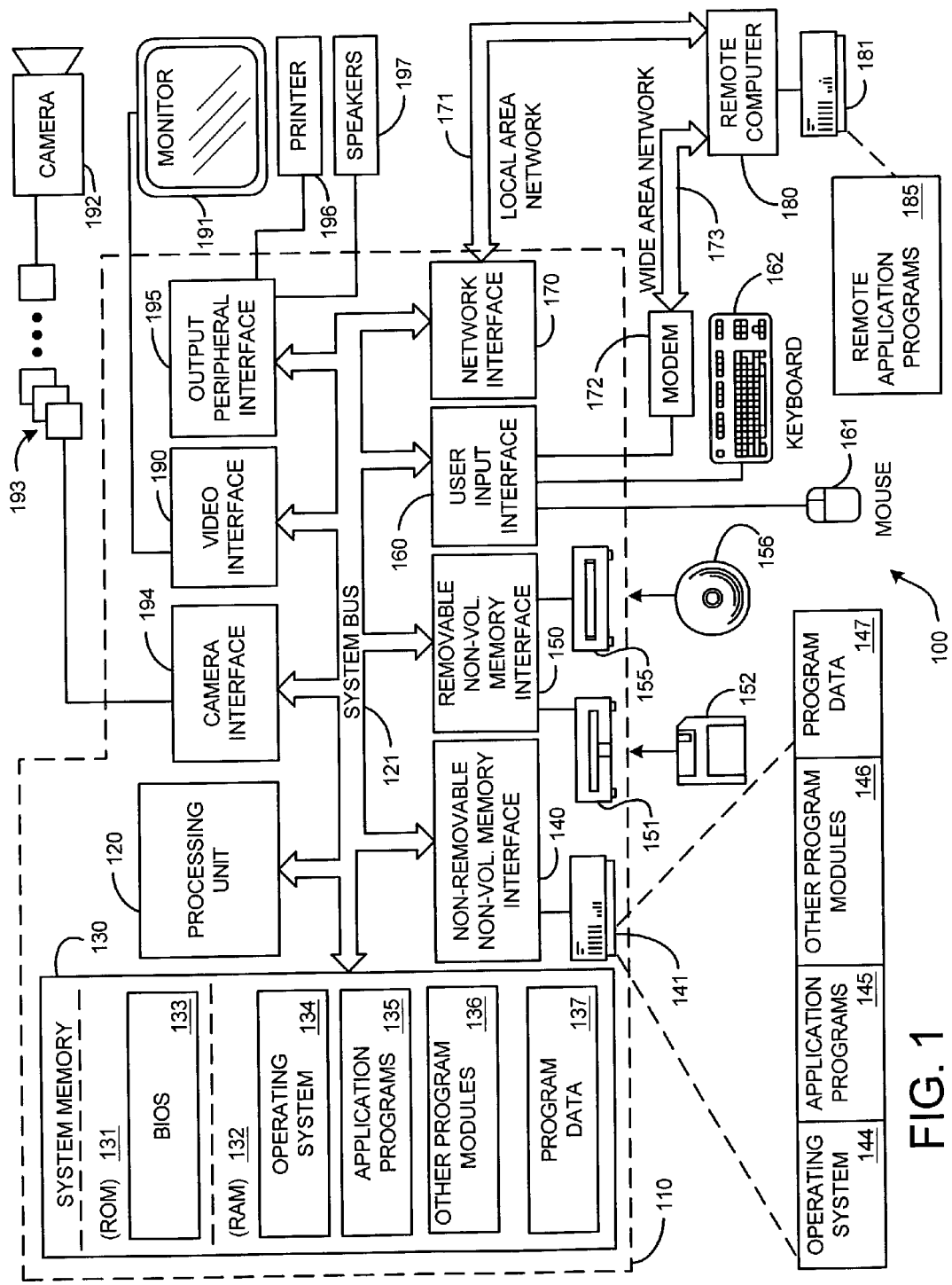
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 192 (such as a digital/electronic still or video camera, or film/photographic scanner) capable of capturing a sequence of images 193 can also be included as an input device to the personal computer 110. Further, while just one camera is depicted, multiple cameras could be included as an input device to the personal computer 110. The images 193 from the one or more cameras are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 Image Editing System and Method.

In this section, the system and method of image editing according to the invention is described.

2.1 Overview

It is typical in image processing to modify original images to obtain a desired result. For instance, color, contrast, size and brightness are often changed to improve image quality and clarity. In the present system and method of image editing, each conventional image processing operation can typically be described by a few parameters. As a result, multiple users can share image processing information by sharing a few parameters instead of exchanging and saving whole image bitmaps. Significant reduction in the data transferred is obtained by this system and method as large digital image files do not have to be transmitted back and forth over a network. Nor do multiple versions of extremely large image files have to be repeatedly saved to the user's computer hard drive.

The invention employs an Editing List that describes the conventional image changes. The size of Editing List is very small and is ideal for network transmission since it requires little bandwidth and can be quickly transmitted. Since only a small Editing List, instead of a huge image data file, is transmitted across a network, the image editing system and method of the invention is also ideal for collaboration of image editing between multiple parties. By decoupling the image Editing List from the original bitmap image, other advantages are also obtained. Each Image Editing List is independent of the images itself. Hence, the same Editing List can be applied to newly created images and also to multiple different images. Also, rendering of these images can be performed at a later time from the image editing, and then only when necessary. This is computationally very efficient.

In the case of collaboration, the transmission time for sending image data is reduced drastically. When two users have the image editing application that understands the aforementioned Editing List, they do not need to send the whole corrected images back and forth again and again in the editing process. They need only send the Editing Lists back and forth to perform image correction.

When the user wants to apply the corrections to multiple images, the image editing application must process corrections to all of the images. This may take time and requires significant computer resources. However, the user may look at and correct only one of those images. This feature is especially useful when corrections need to be made to a series of images taken at approximately the same time and under similar conditions. Specifically, it is not necessary to apply the image corrections to other images until the user wants to see the result applied to all of the images. The corrections will be applied only when the user wants to see the result of the image or when the image is saved. The original file is not modified until the user saves it. Hence, the image editing system and process saves time and is computationally efficient since a user can perfect the corrections to one image before applying the corrections to the others.

The image editing system and method can be used in a standalone, peer-to-peer or server-client configuration.

2.2 Editing List

In the following paragraphs the Editing List format, data fields and Undo function are described.

The Editing List is a list of standard editing parameters that could be generated by any conventional text-editing program when it is expressed in XML format. A special image-editing program can generate the Editing List in binary format.

2.2.1 Editing List Format

As stated previously, the invention employs an Editing List that describes image changes. The Editing List is typically expressed either in binary format or in XML format. Expressing the Editing List in a binary format reduces the file size. Expressing the Editing List in XML format allows text editing of the Editing List parameters. Using XML format is advantageous in that the user can modify the Editing List easily by standard text editing, can analyze it, and can fine tune the parameter values in the Editing List. However, other formatting conventions can be used to format the Editing List as well.

2.2.2 Editing List Fields

Figure 2:
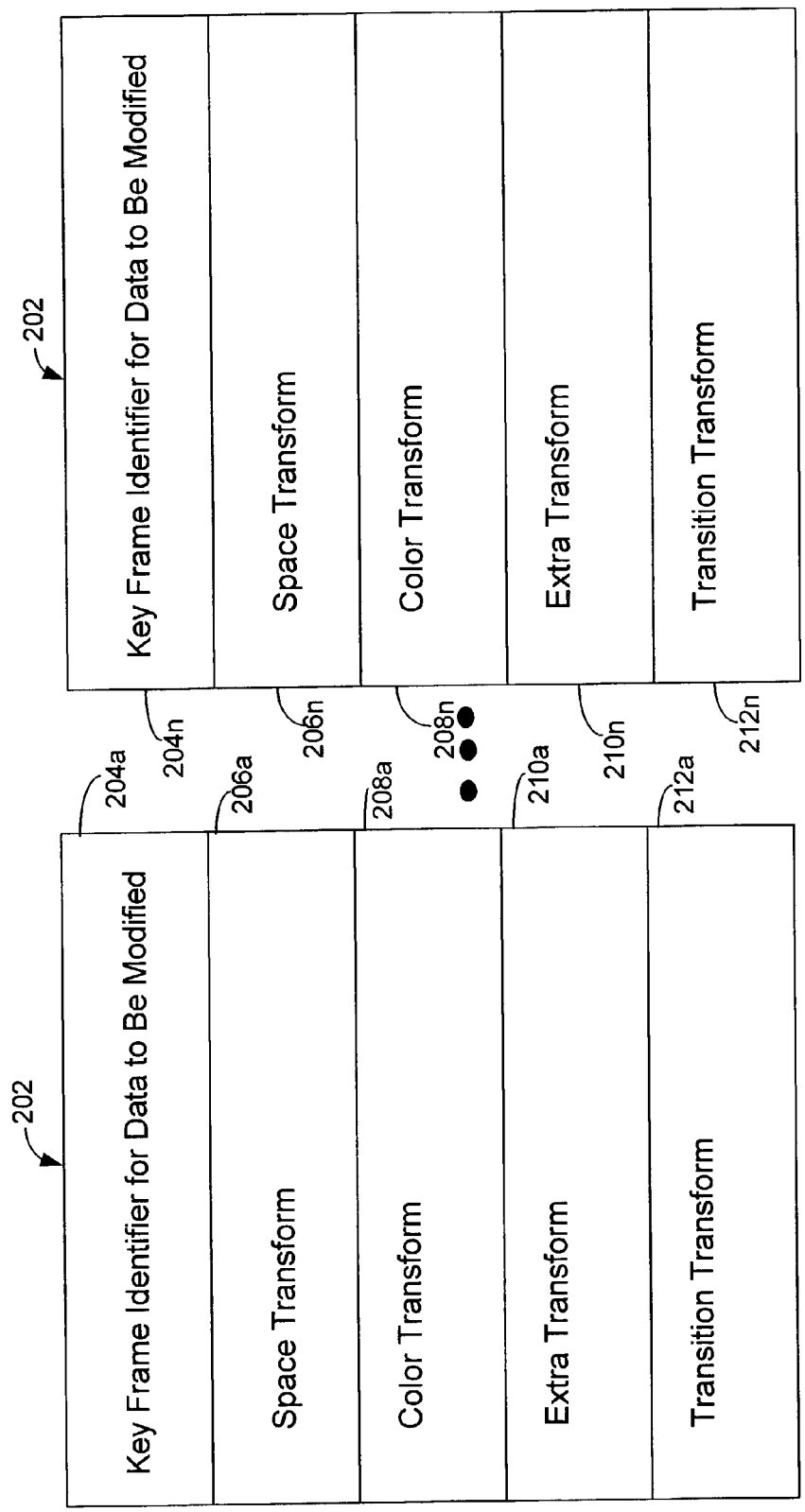
FIG. 2 is a diagram depicting the general fields of an Editing List of the system and method according to the present invention.

In one embodiment of the invention, shown in FIG. 2, the Editing List is composed of a list of Key Image States 202. A Key Image State 202 is basically a set of data fields that define a transitional image that is used to achieve the final edited image. The modifications in the editing list are applied to create the final edited image when a user saves an edited image. Each Key Image State 202 is described by a set of parameters that includes a Key Frame 204a, 204n, Space Transform 206a, 206n, Color Transform 208a, 208n, Extra Transform 210a, 210n, and Transition Transform 212a, 212n. These parameters are described in more detail below.

Key Frame: A key frame is a reference to the base bitmap on a computer readable medium, a network or in computer memory (RAM) to which the Space Transform, Color Transform, Extra Transform or Transition Transform apply. The Key Frame field 204a, 204n provides an identifier as to which image file is being edited or operated on. It is assumed that all parties involved in any collaborative editing have a local copy of this first key frame bitmap. The bitmaps associated with the second and later key frames are created on command.

Space Transform: The Space Transform field 206a, 206n represents the spatial transformation commands that are used to edit the image. Such spatial commands include, for example, rotation, translation, cropping, resizing, and so on.

Color Transform: The Color Transform field 208a, 208n represents the color transformation commands that are used in image editing. These commands include, for example, brightness, contrast, hue, saturation, and red-eye correction.

Extra Transform. Both Space Transform 206a, 206n and Color Transform 208a, 208n fields can coexist at the same time since a spatial operation typically does not affect a color operation, and vice versa. The Extra Transform field 210a, 210n represents a transformation that combines both spatial and color transformations in the same Key Image State, vice using a separate Key Image State for a separate spatial transformation and a separate color transformation. It (the Extra Transform) can produce more general transforms that cannot be expressed by the combination of separate color and space transforms. When the Extra Transform field 210a, 210n is used, both the Space Transform 206a, 206n field and Color Transform field 208a, 208n are set to NULL. For a typical spatial or color image transformation, the Extra Transform field 210a, 210n is set to NULL.

Transition Transform: The Transition Transform field 212a, 212n is set when the added image transformation cannot be merged to the existing Space Transform, Color Transform, or Extra Transform fields. When Transition Transform 212a, 212n is added, it signals the Editing List to create another Key Image State 202 and this Key Image State is added to the Editing List. For example, when the next command is rotation and the previous command is crop, the rotation command is added to the Transition Transform since the rotation command cannot be merged with the crop command.

When image modification commands are added to the Editing List, an image bitmap reflecting the modification is not created, nor is the Key Frame field attached to the image bitmap being modified until the time the application renders the images or saves them. When the Editing List is saved or transmitted over the Internet, the Key Frames are removed to save computer memory.

2.2.3 Editing List Undo Function

The system and method also provides a means for each user to undo their image modifications or the modifications made by other users. Each user modification/image transformation is associated with a Key Image State in the Editing List. An Undo Buffer records each image changing command since the time the image was last saved or rendered and a Key Image State was created. When Undo is called the commands since the last save are reversed and the previous Key Image State is restored. For example, if a user does not like the previous modifications made, the user can activate the Undo Function that reverses the Editing List changes made since the last Key Image State was created. Repeated activation of the Undo Function (e.g., via an Undo button in the image editing application) will restore the sequence of previous Key Image States, undoing the modifications associated with each Key Image State. Alternately, a user can use the Undo function to restore the edited image back to a specific time.

The Undo function is efficient in that the system can issue one command to go back to a specific desired Key Image State, undoing all the intervening modifications in one action.

2.3 Standalone Configuration

The image editing system and method of the invention can be used in a standalone configuration to edit and improve digital images. The standalone version of the image editing application creates the aforementioned Editing List and applies it to create modified images when the user renders or saves the modified image. This embodiment allows a sole user to edit images using the image editing application on a standalone computer. It allows a user to edit images in conventional ways such as changing color, hue, image size and correcting for redeye effects. However, this embodiment of the image editing application has the added advantage of allowing the user to fine tune corrections to one in a series of images and then apply these corrections to the other images in one action. This embodiment also allows the user to reverse any changes to images via the aforementioned Undo function.

2.4 Peer-to-Peer Configuration

Figure 3:
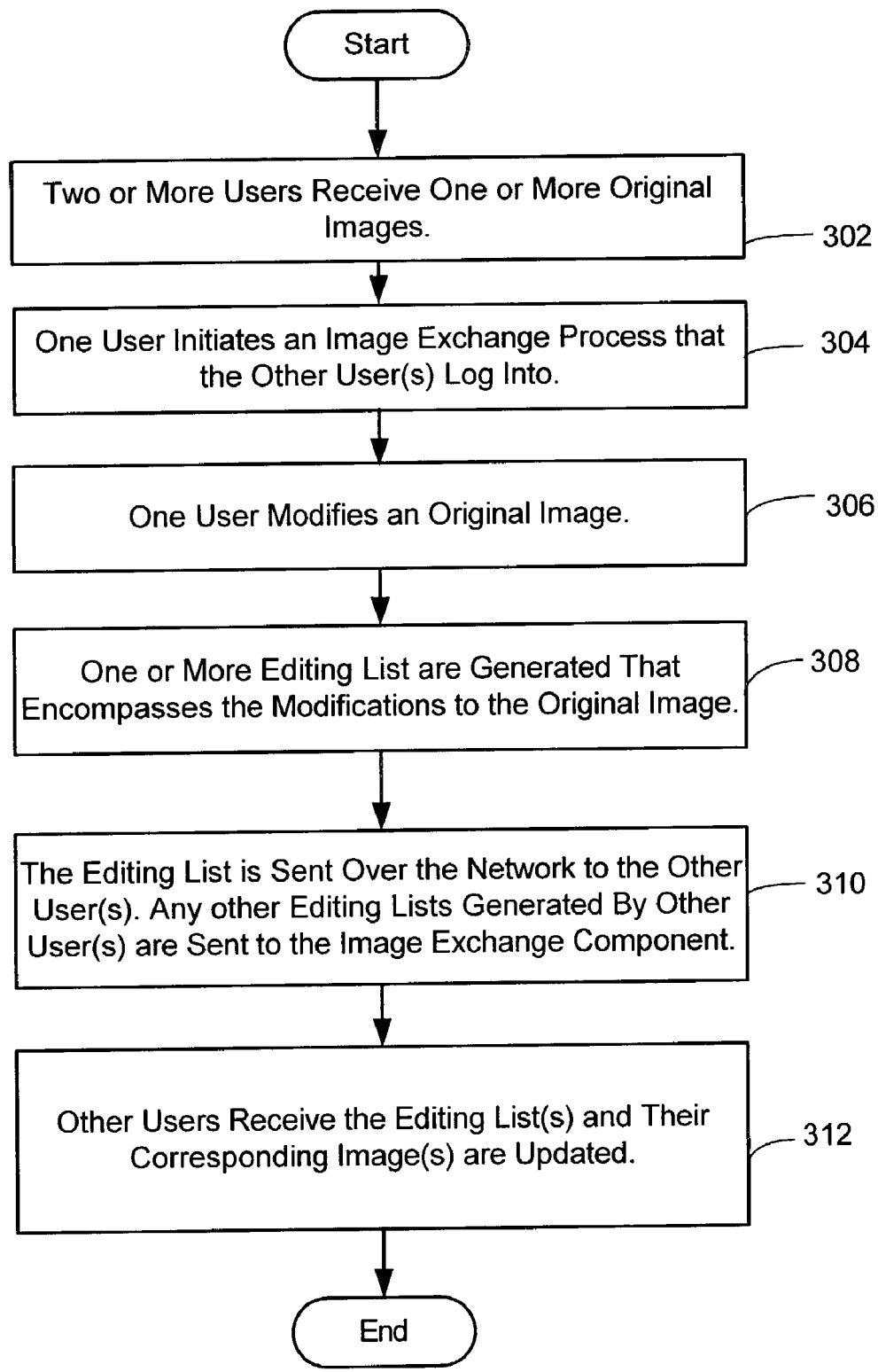
FIG. 3 is a flow diagram detailing data flow in a peer-to-peer network configuration of the system and method according to the present invention.

The present system and method allows image editing in a peer-to-peer configuration. In this peer-to-peer configuration no dedicated central server is employed. In the case of peer-to-peer image editing, as shown in the process flow chart shown in FIG. 3, two or more users first receive the original images that will subsequently be edited (process action 302). The images may be received via a network connection or may be downloaded from computer-readable media such as a CD ROM. Each of the users in the peer-to-peer configuration has an image exchange module as part of the Image Editing system and method of the present invention. The exchanges of images and Editing Lists are handled by the image exchange component of one of the users. One of the users initiates the image exchange process on their computer, and the other user(s) log on to this image exchange component, as shown in process action 304.

As one of the users modifies the original image, an Editing List is generated (process action 306). As shown in process action 308, only the Editing List, not the actual modified image, is sent over the network to the one user's image exchange component, and then on to other users. When these other users receive the Editing List from the image exchange component, they also automatically exchange the Editing Lists they have generated with respect to modifications they have made to shared images via the image exchange component. The received Editing List will automatically update the image on the users' computers in real time, as shown in process action 310, since no time-consuming bitmap transmission is involved.

Figure 4:
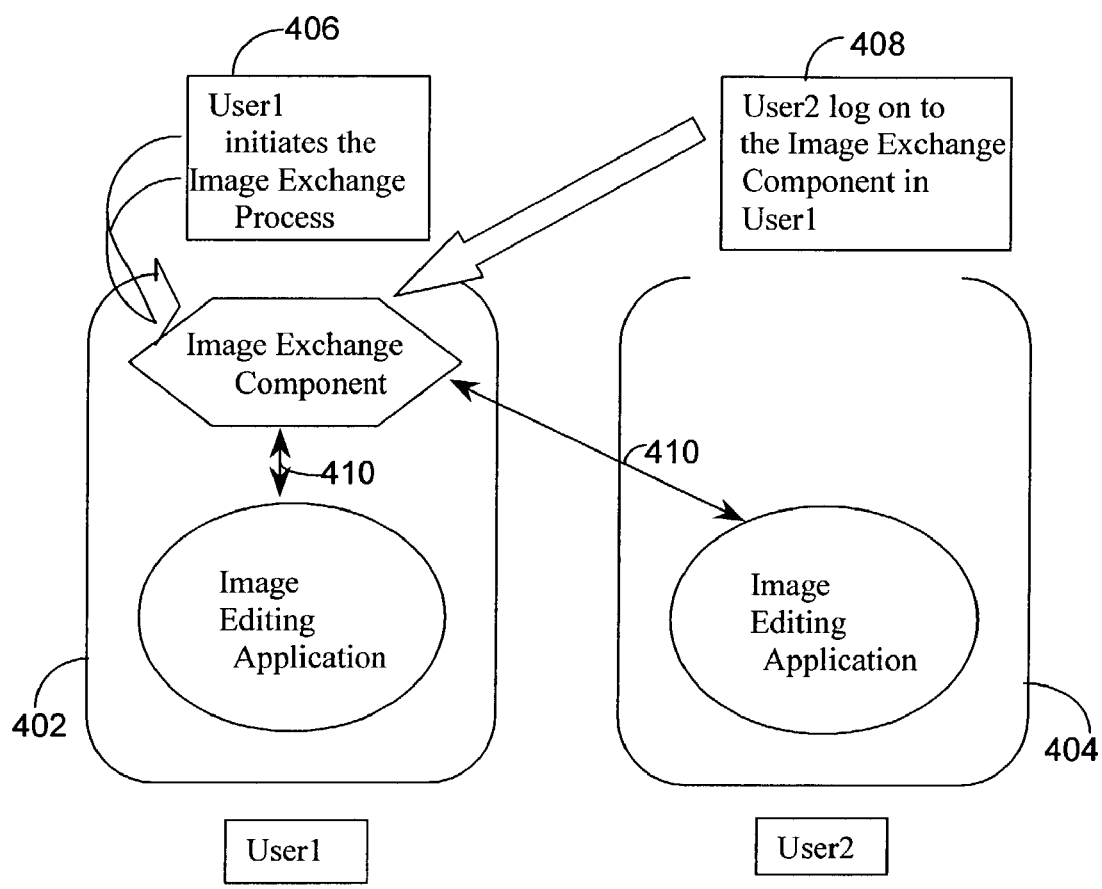
FIG. 4 is a schematic of a peer-to-peer network configuration of the system and method according to the present invention.

FIG. 4 shows a schematic of the peer-to-peer configuration. This configuration includes multiple users' computers (here User1 402 and User2 404). When User1 wants to start collaborating image corrections with other users, User1 initiates the collaboration process by starting an image exchange component of the image editing application of the present invention on his/her computer. Alternately, User1 can start a separate image exchange application that handles Editing List exchanges on their computer. User2 logs on to the image exchange component of User1. The Editing Lists are then exchanged between User1 and User2 through the image exchange component. The images associated with the Editing List modifications are updated at each user as soon as the changes of the Editing Lists are received. This mechanism is not limited to two users. Any number of users can participate in the real time image editing by logging on to the image exchange component of User1. Also, any user can be User1 (the user with the image exchange component) since the image editing application of the invention contains an image exchange component for each user.

Figure 5:
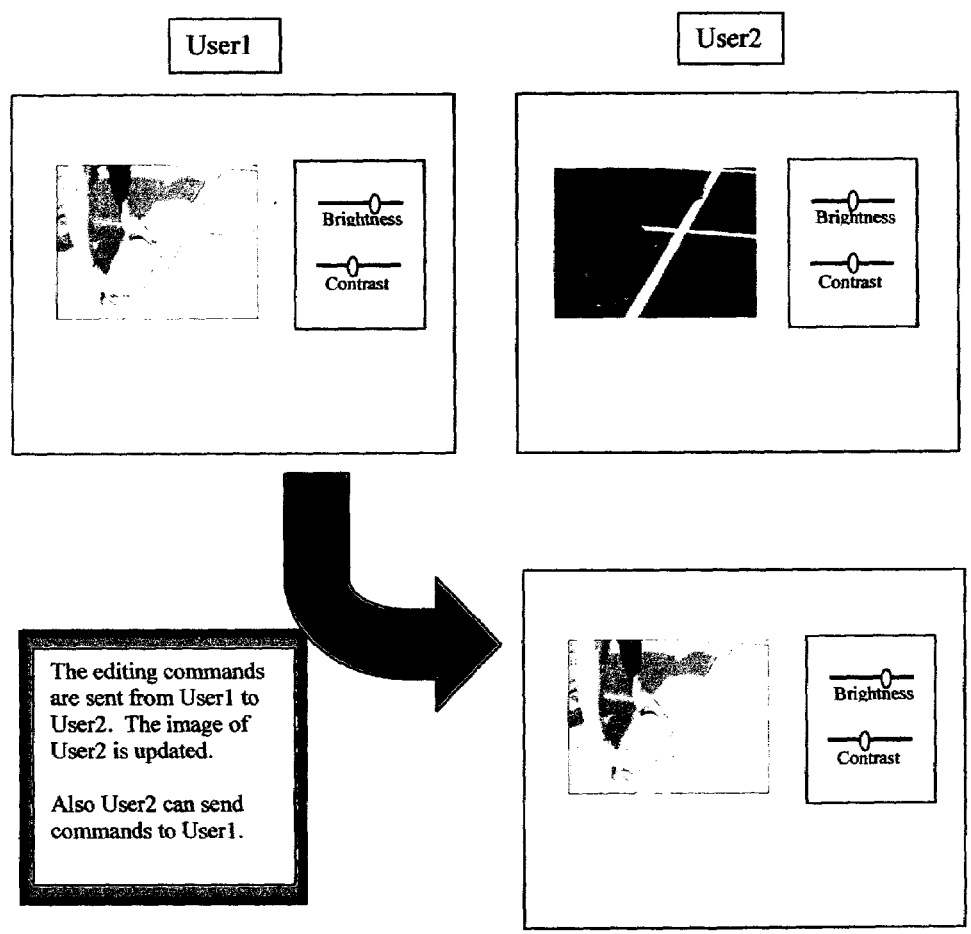
FIG. 5 is a diagram depicting one user's image modifications applied to another user's image via the Editing List mechanism of the present invention.

FIG. 5 shows an example of two users performing image editing collaboratively. This case is called peer-to-peer because the users interact directly and operate on the images to be modified without a dedicated server. As shown in FIG. 5, User1 changes the brightness and contrast of an image that is held by both User1 and User2. Those changes are sent to the User2 via the Editing List and his/her image is updated accordingly. The image itself is not transmitted. Only the image changes embodied in the Editing List are transmitted over the network. Since the size of the Editing List is typically much smaller than the image itself, the network transmission time is minimal. This allows two users to have a virtually real time image correction over the network. Furthermore, it should be noted that this mechanism is not limited to two users. Any number of the users can participate in this real time image editing.

2.5 Server-Client Configuration

Figure 6:
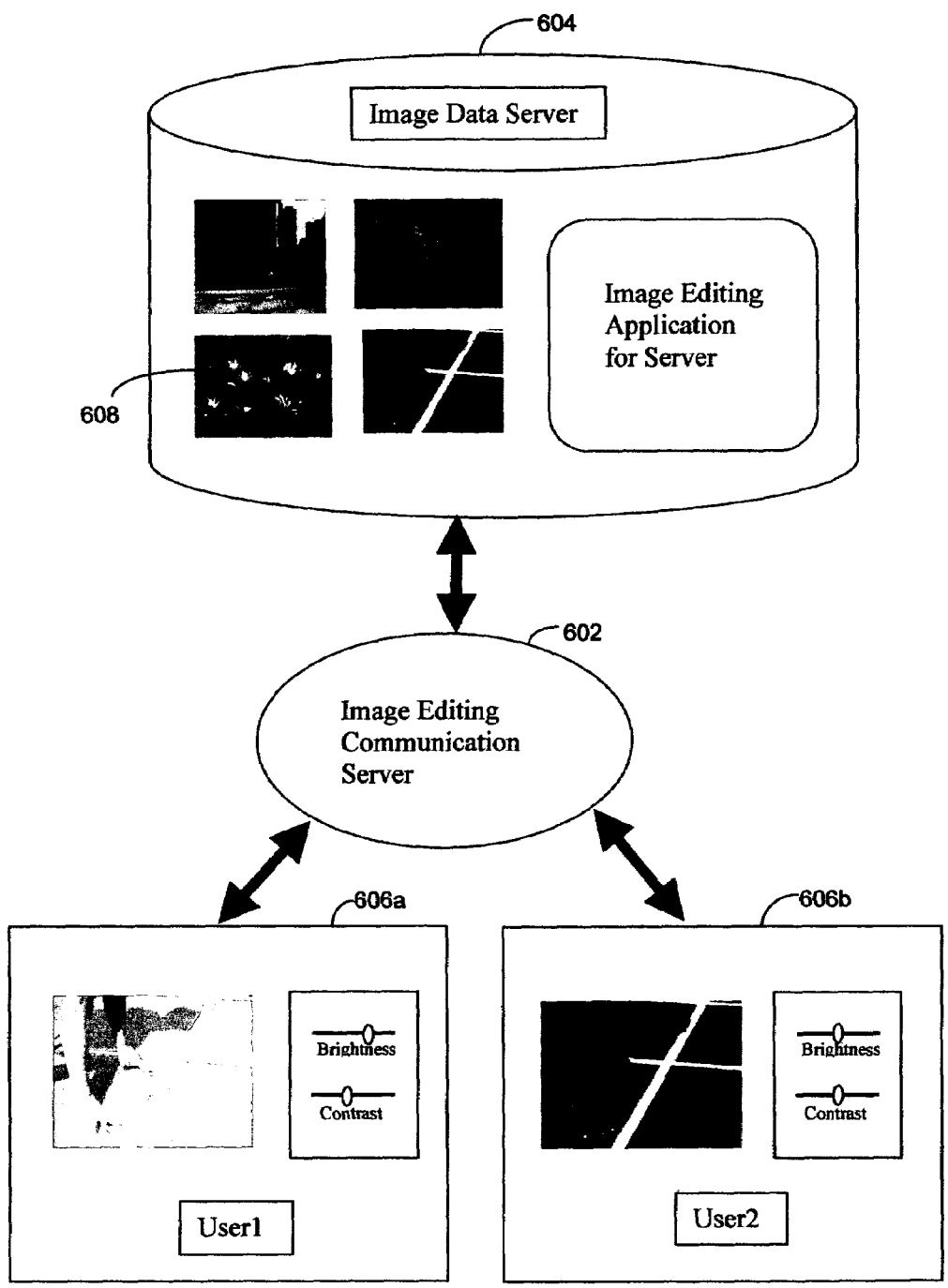
FIG. 6 is a schematic of a server-client configuration of the system and method according to the present invention.

FIG. 6 depicts the process of collaborative image editing by using one or more dedicated servers in a server-client configuration. In this embodiment, in order to perform collaborative image editing, users 606a, 606b log on to a Communication Server 602 for image editing. In addition to the Communication Server 602, one or more Image Data Servers 504 that contain the actual images to be modified are also employed by the system in this configuration. The Communication Server 602 can be physically different from the Image Data Server or servers 604, or one server can be used to perform both the communications and image database functions. The Communication Server 602 controls the flow of the information between users 606a, 606b and Image Data Server(s) 604.

Figure 7:
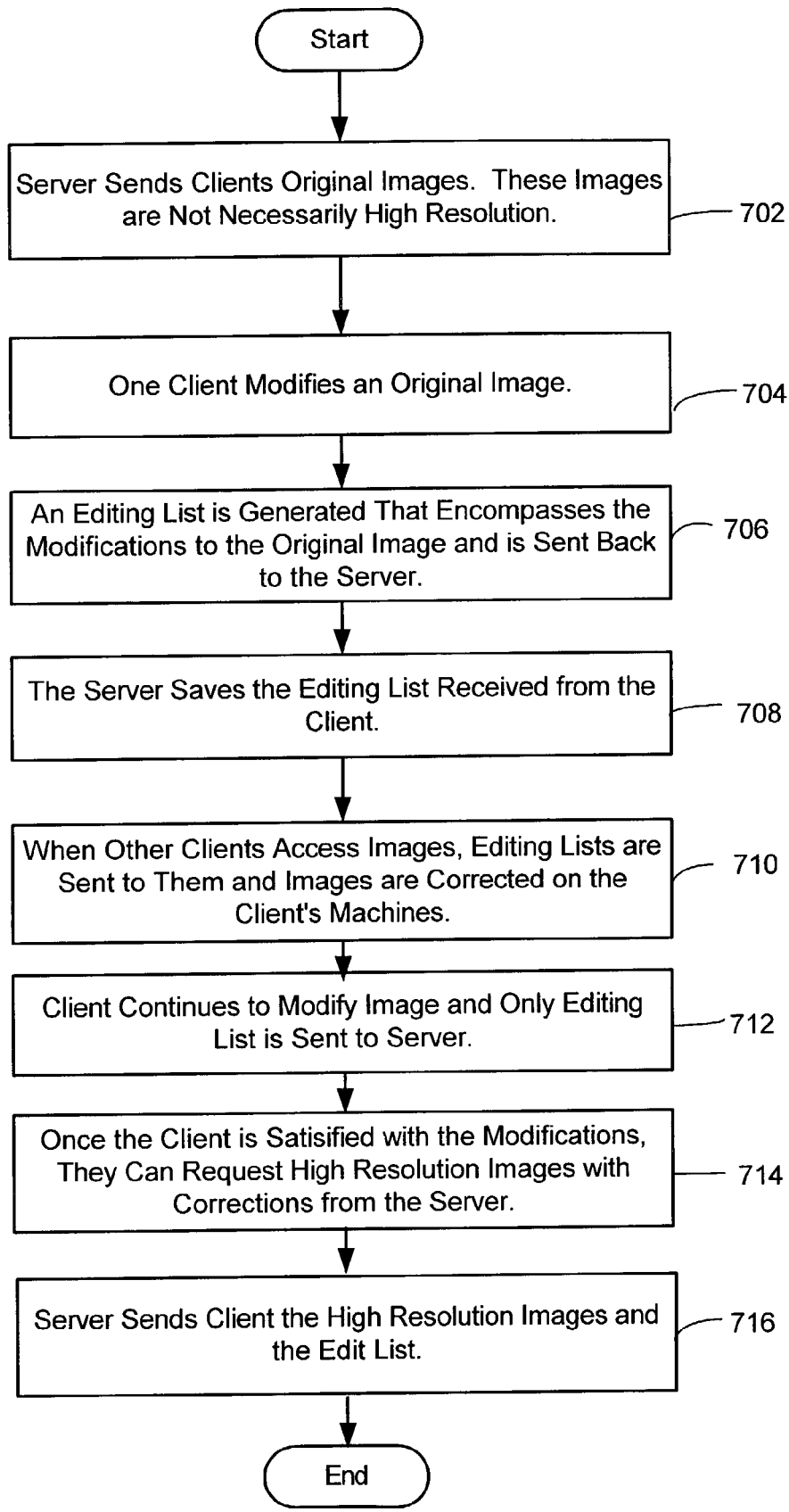
FIG. 7 is a flow diagram detailing the data flow in a server-client network configuration of the system and method according to the present invention.

Referring now to FIG. 7, the Communication Server sends copies of the images that are to be modified to the users if they do not have them already (process action 702). Instead of sending the high-resolution images resident on the Image Data Servers, smaller thumbnail versions or lower resolution versions of these images are sent to the users. By doing so large image data files are not unnecessarily transmitted over the network.

The users then edit the images on their computers. When the users perform the image editing on the images that they have received from the Image Data Server(s) (process action 704), they generate and send back only the Editing Lists over the network (process action 706). The Image Data Server(s) store the Editing Lists for each of the corresponding images (process action 708). When another user retrieves a particular image from the Image Data Server(s), the Image Data Server(s) send the Editing Lists corresponding to the images (process action 710). If the users have not received the smaller sized or lower resolution images, the Image Data Servers also send those images.

When the Editing Lists are changed or updated for those images, only the Editing Lists need to be sent over the network (process action 712). When the users modify the images, they do not have to send the images themselves. Only the Editing Lists are sent to the Image Data Servers since the Image Data Servers already have the original images. This significantly reduces the network traffic. The Image Data Server will only send full resolution images when the users request them (process actions 714 and 716). Any changes in the Editing Lists are recorded and sent to the other users.

Image processing via the Editing List of the full resolution images can be processed either on server side or on user/client side. That is, the corrections to the images can be applied to the high resolution images via the Editing List before they are sent from the server, or alternately the clients can apply the Editing List to the high resolution images to obtain the modified version thereof locally on their computers.

3.0 Alternate Embodiments Employing an Editing List to Modify Other Types of Data It is possible to modify other types of data by using an abbreviated list of changes such as are embodied by the Editing List employed by the Image Editing system and method of this invention.

For instance, images in an image database are usually associated with some sort of annotation data, commonly referred to as meta data, which assists a user in locating a given image by searching using keywords that describe the image. Users of the aforementioned image editing system can also modify and exchange meta data using the Editing List. Modifications to the meta data are exchanged via the Editing List in the same way as image modifications, but different data fields representing the annotation data are used in the Editing List. Modifications can continually be made to the meta data until the data is saved by a user at which point the meta data is saved and attached to the image file.

Similarly, the system and method of the invention can be employed to modify audio data over a network. Like image data, audio files can be very large and typically consume large amounts of network bandwidth to transmit to other users. In a manner similar to the method discussed above with respect to images, the Editing List can be applied to modify audio files. The Editing List fields are again tailored to the audio application. For example, volume, qualitization parameters, left-right balance, and various filter parameters can be sent as commands to form Editing List for sound.

Another embodiment of the present invention relates to formatting changes that might be applied to an electronic document. Such changes include page size, font style and size, layout commands and so on. When collaboratively editing an electronic document, users can employ the Editing List to send only the reformatting commands for the document to other users instead of sending the whole reformatted document.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

Wherefore, what is claimed is:

1. A computer-implemented process for editing digital images over a network, comprising using a computer to perform the following process actions:
    inputting an image to be modified at more than one client of a network;
    making proposed modifications to said image at a first client;
    creating an editing list independent of the image itself of said proposed modifications at said first client, said editing list embodying commands for making the modifications to said image;
    transmitting said editing list over a network to a second client; and
    applying said editing list to said image to modify the image at a second client.

2. The computer-implemented process of claim 1 wherein said inputting process action comprises one of:
    inputting said image from a computer-readable medium;
    inputting said image from computer memory; and
    inputting said image by receiving it over a network.

3. The computer-implemented process of claim 1 wherein said modifying process action comprises modifying the spatial characteristics of the image.

4. The computer-implemented process of claim 3 wherein the process action of modifying the spatial characteristics comprises at least one of:
    rotating said image;
    using translation to modify said image;
    cropping said image; and
    resizing said image.

5. The computer-implemented process of claim 1 wherein said modifying process action comprises modifying the color characteristics of the image.

6. The computer-implemented process of claim 5 wherein modifying the color characteristics comprises at least one of:
    changing image color;
    changing image brightness;
    changing image contrast;
    changing image hue; and
    changing image saturation.

7. The computer-implemented process of claim 1 wherein said modifying process action comprises modifying a combination of the spatial and color characteristics of the image.

8. The computer-implemented process of claim 1 wherein said modifying process action comprises creating a transitional image with said modification.

9. The computer-implemented process of claim 8 wherein said transitional image comprises one of:
    a key frame representing an image bitmap of the image to be modified;
    a space transform representing spatial transformations made to modify said image;
    a color transform representing color transformations made to modify said image;
    an extra transform representing a combination of spatial and color transformations made to modify said image; and
    a transition transform representing transformations that cannot be merged to any of the space, color or extra transforms.

10. The computer-implemented process of claim 1 further comprising:
    undoing proposed modifications at said first client; and
    removing said undone proposed modifications from said editing list.

11. The computer-implemented process of claim 1 wherein said editing list is applied to a different image.

12. The computer-implemented process of claim 1 further comprising the process actions of:
    transmitting said editing list from said second client over a network to a third client; and
    applying said editing list to another image to modify that image at said third client.

13. A system for editing digital images over a network, the system comprising:
    a general purpose computing device; and
    a computer program comprising program modules executable by the computing device, wherein the computing device is directed by the program modules of the computer program to,
    input an image to be modified to at least two clients;
    initiate an image exchange module at a first of said clients;
    make proposed modifications to said image at a second of said clients;
    create an editing list of said proposed modifications at said second of said clients, said editing list embodying commands for making the modifications to said image but being independent of the image itself;
    transmit said editing list from said second client to said first client over a network; and
    apply said editing list to said image to modify the image at said first of said clients.

14. The system of claim 13 wherein said program module to apply said editing list to said image applies said editing list to a different image than the one modified at said first of said clients.

15. A computer-readable medium having computer-executable instructions for editing data over a network, said computer executable instructions comprising:
    inputting data to be modified to at least two clients;
    initiating a data exchange module at a first of said clients;
    making proposed modifications to said data at a second of said clients;
    creating an editing list of said proposed modifications at said second of said clients, said editing list embodying commands for making the modifications to said data but being independent of the data itself;
    transmitting said editing list from said second client to said first client over a network; and
    applying said editing list to said data to modify the data at said first of said clients.

16. The computer-readable medium of claim 15 wherein the data is at least one of:
   image data;
   image annotation data;
   audio data; and
   document formatting data.

17. The computer-readable medium of claim 15 wherein said editing list is applied to different data than that modified at said second client to modify that different data at said first of said clients.

* * * * *